(12) United States Patent
Cai et al.

(10) Patent No.: US 12,401,517 B2
(45) Date of Patent: Aug. 26, 2025

(54) DYNAMIC, COMPREHENSIVE, AND INTELLIGENT INTEGRATION OF TELECOMMUNICATION NETWORK RESOURCES FOR BLOCKCHAIN OPERATIONS

(71) Applicant: T-Mobile USA, Inc., Bellevue, WA (US)

(72) Inventors: Zheng Cai, Fairfax, VA (US); Durga Prasad Satapathy, Ashburn, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 381 days.

(21) Appl. No.: 18/169,705

(22) Filed: Feb. 15, 2023

(65) Prior Publication Data
US 2024/0275605 A1   Aug. 15, 2024

(51) Int. Cl.
*H04L 9/32*    (2006.01)
*H04L 9/00*    (2022.01)
*H04W 4/50*    (2018.01)

(52) U.S. Cl.
CPC .............. *H04L 9/3239* (2013.01); *H04L 9/50* (2022.05); *H04W 4/50* (2018.02)

(58) Field of Classification Search
CPC ........... H04L 9/3239; H04L 9/50; H04W 4/50
See application file for complete search history.

(56) References Cited

U.S. PATENT DOCUMENTS

| | | |
|---|---|---|
| 10,673,618 B2 | 6/2020 | Suthar et al. |
| 10,708,250 B2 | 7/2020 | Simons |
| 10,986,162 B2 | 4/2021 | Feng et al. |

(Continued)

FOREIGN PATENT DOCUMENTS

| | | |
|---|---|---|
| CN | 113259378 B | 10/2021 |
| DE | 102019214255 A1 | 3/2021 |
| DE | 102020208023 A1 | 4/2021 |
| EP | 3910880 A1 | 11/2021 |
| KR | 102139549 B1 | 8/2020 |
| KR | 20200115786 A | 10/2020 |

(Continued)

OTHER PUBLICATIONS

A. E. Azzaoui, S. K. Singh, Y. Pan and J. H. Park, "Block5GIntell: Blockchain for AI-Enabled 5G Networks," in IEEE Access, vol. 8, pp. 145918-145935, 2020, doi: 10.1109/ACCESS.2020.3014356. (Year: 2020).*

*Primary Examiner* — Carl G Colin
*Assistant Examiner* — Phillip Emmanuel Wilson
(74) *Attorney, Agent, or Firm* — Perkins Coie LLP

(57) ABSTRACT

The disclosed technology relates to utilizing computing resource nodes available to a wireless telecommunications network to distribute performance of blockchain operations throughout the wireless telecommunication network nodes. A wireless telecommunication network includes computing resources across multiple domains, including core network servers, base stations, and user devices. An example wireless telecommunication network includes a network-integrated blockchain service via which a blockchain node can submit a service request for usage of network resources to complete a blockchain operation (e.g., determining a cryptographic hash of data to be added to a blockchain) and via which a service result (e.g., a final hash value) can be returned to the blockchain node. The network-integrated blockchain service uses a machine learning (ML) model to predict and select certain network computing devices with resource availability.

20 Claims, 9 Drawing Sheets

(56) References Cited

U.S. PATENT DOCUMENTS

| | | | |
|---|---|---|---|
| 10,986,184 | B1 | 4/2021 | Seymour et al. |
| 11,133,983 | B2 | 9/2021 | Obaidi et al. |
| 11,194,791 | B1 | 12/2021 | Baine et al. |
| 11,223,692 | B2 | 1/2022 | Yang |
| 11,232,446 | B2 | 1/2022 | Aiello et al. |
| 11,240,002 | B2 | 2/2022 | Jo |
| 11,544,291 | B2 | 1/2023 | Iftemi |
| 2020/0314648 | A1* | 10/2020 | Cao .................. H04L 9/0637 |
| 2022/0030446 | A1 | 1/2022 | Sava et al. |
| 2022/0272043 | A1 | 8/2022 | Mishra et al. |
| 2023/0247094 | A1* | 8/2023 | Wang .................. G06F 16/182 |
| | | | 709/217 |
| 2025/0112825 | A1* | 4/2025 | Guim Bernat ........ H04L 9/0637 |

FOREIGN PATENT DOCUMENTS

| | | |
|---|---|---|
| KR | 102215978 B1 | 2/2021 |
| KR | 102296907 B1 | 9/2021 |
| WO | 2020113081 A1 | 6/2020 |
| WO | 2020118007 A1 | 6/2020 |
| WO | 2020120933 A1 | 6/2020 |
| WO | 2020136641 A1 | 7/2020 |
| WO | 2020150919 A1 | 7/2020 |
| WO | 2021012500 A1 | 1/2021 |
| WO | 2021012911 A1 | 1/2021 |
| WO | 2021027570 A1 | 2/2021 |
| WO | WO-2021121596 A1 * | 6/2021 |

* cited by examiner

DYNAMIC, COMPREHENSIVE, AND INTELLIGENT INTEGRATION OF TELECOMMUNICATION NETWORK RESOURCES FOR BLOCKCHAIN OPERATIONS

BACKGROUND

Blockchains, or digital cryptographic distributed ledgers, are supported by networks of computing devices that perform computationally-intensive operations to verify, contribute to, and maintain the blockchains. The computationally-intensive operations can involve complex cryptographic calculations and can be used to provide a consensus among a network of computing devices.

BRIEF DESCRIPTION OF THE DRAWINGS

Detailed descriptions of implementations of the present invention will be described and explained through the use of the accompanying drawings.

Figure 1:
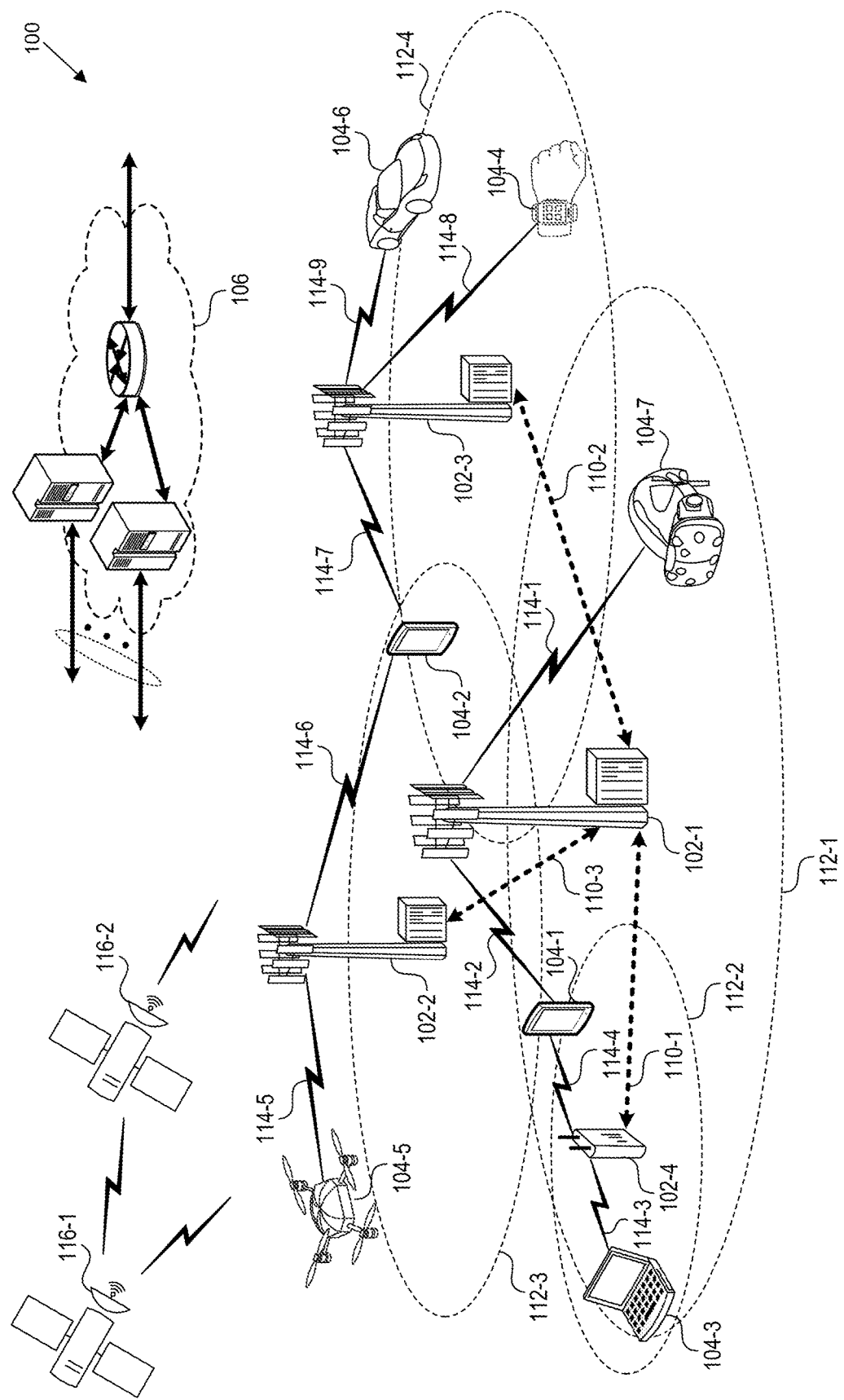
FIG. 1 is a block diagram that illustrates a wireless telecommunication network that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology addresses various technical challenges associated with blockchain technology. Blockchains, and in particular those that implement POW consensus mechanisms (e.g., a Bitcoin blockchain and other POW blockchains), are significantly resource intensive. It is necessary to have high computing processing capability, as only the first node that successfully solves a given hash function via expended effort is able to add a given set of data to the blockchain. For more widespread application and use of POW blockchain architectures, high processing servers are required, which can be an infeasible threshold. Moreover, the high processing servers not only have to be deployed, but also require space that accommodates the consumption of high electrical power due to very high computationally intensive work.

Accordingly, the disclosed technology can significantly reduce the cost for the integration and use of blockchain technology, by reducing the need for dedicated and high processing servers that support the blockchain technology. Electric and power usage of such processing servers is also reduced. The disclosed technology also improves computational resource usage and distribution.

The disclosed technology relates to the intelligent distribution of computationally-intensive blockchain operations dynamically throughout different device types of a wireless telecommunication network, such as a 5G/6G network. Wireless telecommunication networks have different computational resources in core networks, radio access networks (RAN), and connected devices. Each of the computing devices or systems in these domains can be at different utilization levels at different times. When these resources are available, these heterogenous computing devices or systems can be used as computational resources for performing blockchain operations, such as proof-of-work (POW) mining operations. The computing devices of a wireless telecommunication network that can be recruited for blockchain operations are comprehensive—for example, the computing devices include personal devices connected to the wireless communication network (e.g., via 5G, via Wi-Fi), base stations, application servers implementing core network functions, and/or the like. Wireless telecommunication networks are uniquely suited for the dynamic and intelligent distribution of computations throughout network domains, due at least in part on the ability to obtain detailed capacity/usage, performance, and/or capability data and predictions thereof. While some discussion in this document is in the context of blockchain operations and computations, one of skill in the field of the disclosed technology would understand that the disclosed technology will similarly apply to other types of distributed operations.

According to example implementations, a Blockchain Service Repository Function (BCSRF) residing within the wireless telecommunications network (e.g., a 5G network) acts as a bridge or interface between the wireless telecommunications network and a blockchain network. In example implementations, the BCSRF allocates blockchain operations to different devices within the wireless telecommunications network for computation, in response to a request received by the BCSRF from a blockchain node of the blockchain network. In its allocation, the BCSRF can implement and use a machine learning (ML) model that identifies particular devices to recruit for performance of blockchain operations, how long to recruit each particular device for, how many computations to allocate to each particular device, and/or the like. In some implementations, the particular devices identified by the BCSRF and the ML model is based on a type of blockchain operations needed, including cryptographic hash computations, cryptographic encryption computations, encryption computations, data storage operations, and other functions related to the blockchain. In some implementations, the BCSRF determines which operations to assign to which devices. In some implementations, ML model insights used for this dynamic allocation are based on registered capability profiles as well as real-time usage and availability data. Given that certain devices within a wireless telecommunications network may also be mobile, real-time latency information for different devices can be used as a factor (e.g., in the ML model) to determine optimal allocation of blockchain operations.

Because a wireless telecommunication network is configured to collect detailed usage data for connected devices, specific computing resources can be more intelligently selected and allocated. In particular, with enhanced data profiles on devices of a wireless telecommunication network, enhanced predictions can be made with respect to present and future resource usage by the devices. Recruitment of computing resources can also be more comprehensive and scalable within a wireless telecommunication network, due to the availability of heterogenous computing resources. For example, a wireless telecommunication network includes core network servers, base stations, and user devices that each include computing resources, and additional user devices with more computing resources can connect to the wireless telecommunication network.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Wireless Communications Systems

FIG. 1 is a block diagram that illustrates a wireless telecommunication network 100 in which aspects of the disclosed technology are incorporated. The disclosed technology enables the wireless telecommunication network 100 to be bridged and cooperate with a blockchain network. In particular, the disclosed technology involves the heterogenous devices of the wireless telecommunication network 100 to each be used to perform blockchain operations. For example, a blockchain node of a blockchain network can send a request to the wireless telecommunication network 100 for heterogenous computing resources of the wireless telecommunication network 100 to be used to perform certain intensive computations.

The wireless telecommunication network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The wireless telecommunication network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of the wireless telecommunication network 100 also include wireless devices 104-1 through 104-7 (referred to individually as "wireless device 104" or collectively as "wireless devices 104" and also referred to herein as user equipment or UE) and a core network 106. The wireless devices 104-1 through 104-7 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

Wireless devices 104 of the wireless telecommunication network 100 vary in type and capability. For example, the wireless devices 104 illustrated in FIG. 1 includes a head-mounted device (HMD) that is configured to execute XR services (104-7), a smart watch device (104-4), a mobile phone (104-1), and others. The wireless devices 104 each execute different services or applications and according to aspects of the disclosed technology, handover of the wireless devices 104 within the wireless telecommunication network 100 is specific to each wireless device 104 and the services or applications presently being executed at each wireless device 104.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The wireless telecommunication network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The wireless telecommunication network 100 can include a 5G network and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The wireless telecommunication network 100 can thus form a heterogeneous network in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the wireless telecommunication network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunication network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network equipment at the edge of the wireless telecommunication network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in wireless telecommunication network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links. In handover operations, communication links 114 can be created, redirected or modified, and/or terminated in order to provide UE mobility within the wireless telecommunication network 100.

In some implementations of the wireless telecommunication network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the wireless telecommunication network 100 implements 6G technologies including increased densification or diversification of network nodes. The wireless telecommunication network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the wireless telecommunication network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, ARNR, and wireless high-bandwidth secure communications. In another example of 6G, the wireless telecommunication network 100 can implement a converged Radio Access Network (RAN) and Core architecture to achieve Control and User Plane Separation (CUPS) and achieve extremely low User Plane latency. In yet another example of 6G, the wireless telecommunication network 100 can implement a converged Wi-Fi and Core architecture to increase and improve indoor coverage.

Example Telecommunication Network Functions

Figure 2:
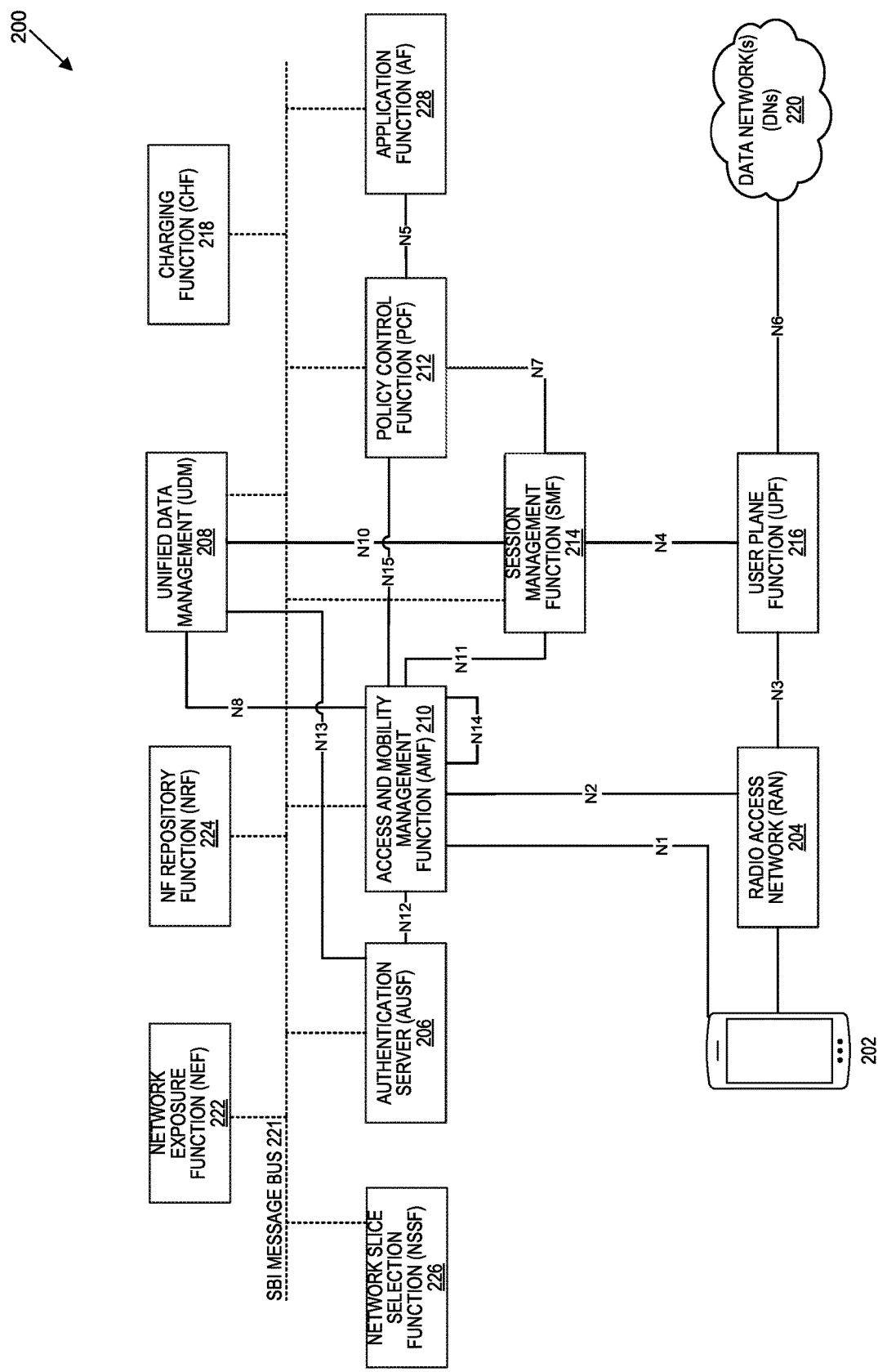
FIG. 2 is a block diagram that illustrates network functions (NFs) of a wireless telecommunication network that can implement aspects of the present technology.

FIG. 2 is a block diagram that illustrates an architecture 200 including network functions (NFs) that are related to aspects of the present technology. For example, the network functions in the illustrated example belong to a 5G core network. It will be appreciated that the disclosed technology is also applicable to network functions associated with a 4G LTE core network (e.g., Evolved Packet Core, or EPC), a 6G core network, and/or the like.

According to FIG. 2, a wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218. In some implementations, one or more NFs of the core network perform example operations described herein to detect network-supported services being executed by a UE, provide event thresholds that correspond to network-supported services to UEs, and facilitate handover of UEs between network cells and/or nodes.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Example Implementations of Blockchain Service Repository Function

The disclosed technology relates to dynamic and ML-based usage of computing resources throughout multiple domains of a wireless telecommunication network for blockchain operations. For example, the wireless telecommunication network provides a blockchain service for blockchain nodes in which the blockchain nodes can use the resources of the wireless telecommunication network for intensive blockchain-related computations, such as those related to blockchain mining. Accordingly, the disclosed technology addresses technical problems related to the significant resource consumption of blockchain systems and networks.

Figure 3A:
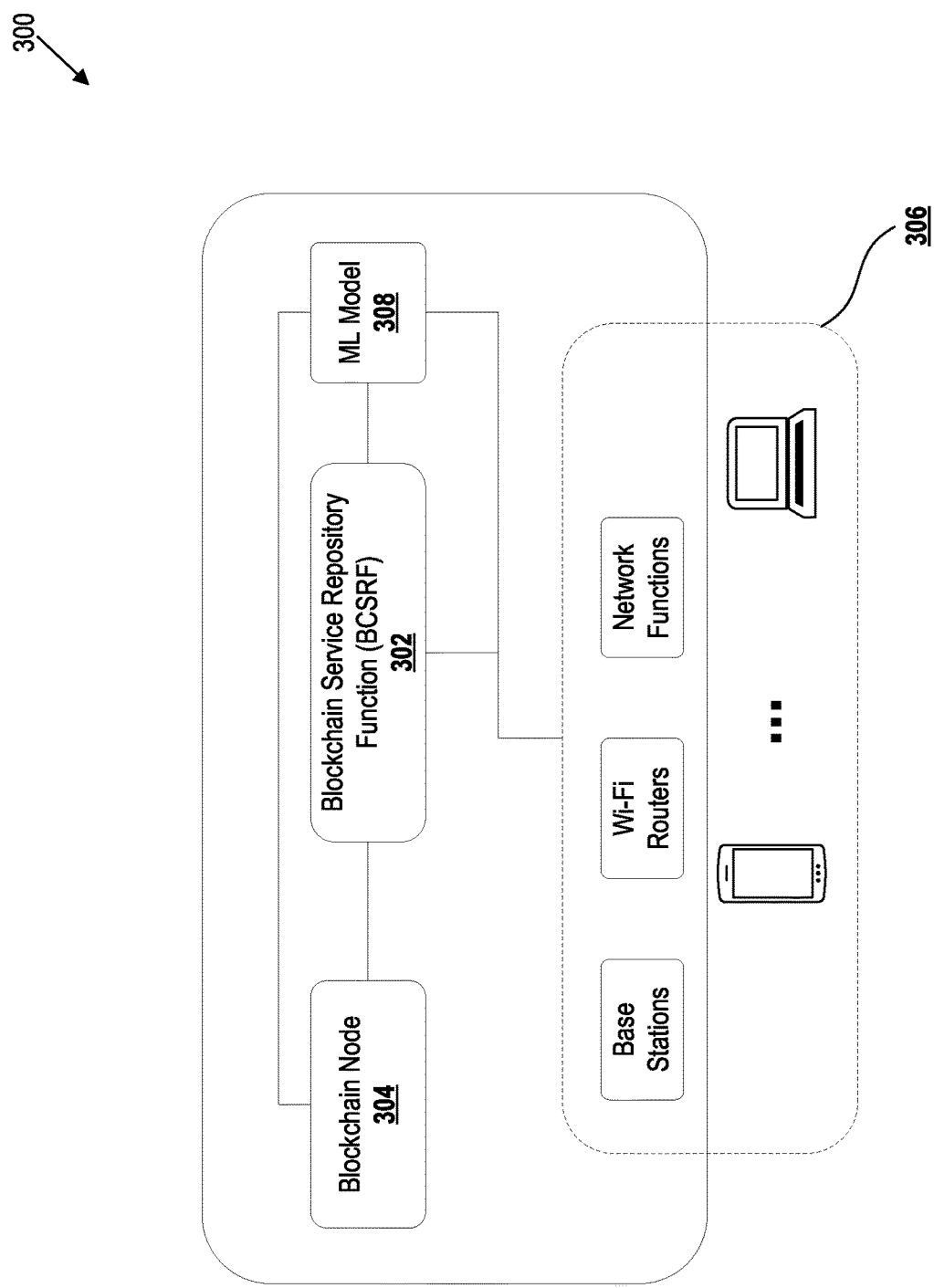
FIG. 3A is a block diagram that illustrates an example implementation of a network-integrated blockchain service for dynamically selecting cross-domain or heterogenous computing resources throughout a wireless telecommunication network for blockchain operations, in accordance with embodiments of the present disclosure.
Figure 3B:
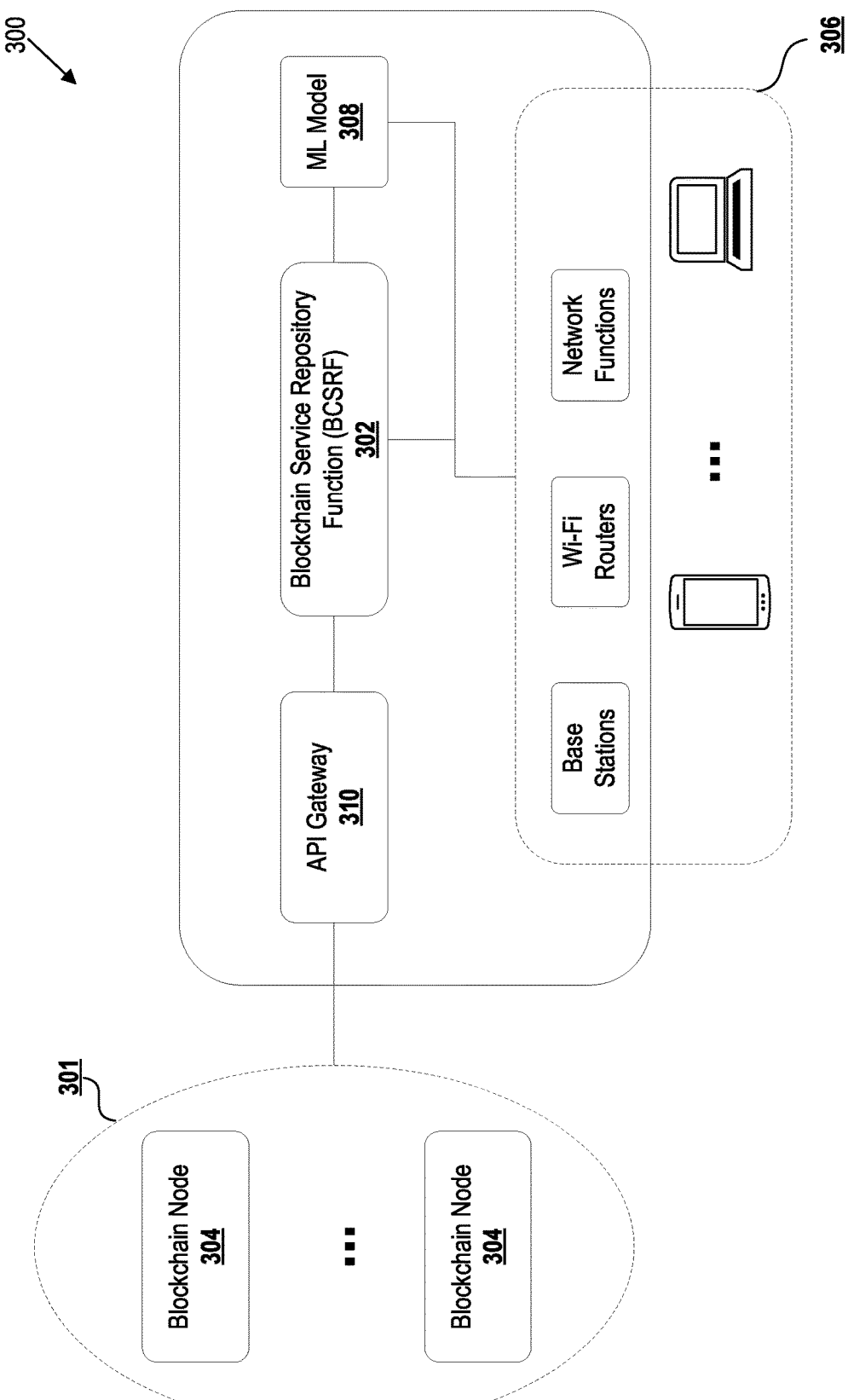
FIG. 3B is a block diagram that illustrates another example implementation of a network-integrated blockchain service for dynamically selecting cross-domain or heterogenous computing resources throughout a wireless telecommunication network for blockchain operations, in accordance with embodiments of the present disclosure.

FIGS. 3A and 3B illustrate diagrams of example implementations in which computing resources of wireless telecommunication network 300 can be dynamically recruited and used for blockchain operations. In each of FIGS. 3A and 3B, a wireless telecommunication network 300 is illustrated, and the wireless telecommunication network 300 includes a network-integrated blockchain service, for example, a blockchain service repository function (BCSRF 302). According to the disclosed technology, the BCSRF 302 is configured to implement an interface or a bridge to the computing resources of the wireless telecommunication network 300 for blockchain nodes 304 of a blockchain. Via the BCSRF 302, blockchain data to be added, modified, or deleted (e.g., transaction data) is distributed to one or more network computing devices 306 belonging to the wireless telecommunication network 300 for the network computing devices 306 to perform operations on the blockchain data. Thus, for example, un-hashed blockchain data that requires hashing to be added to a blockchain can be sent to the network computing devices 306 to perform hashing operations, and the BCSRF 302 can return a final hash result or output to the blockchain node 304. The blockchain node 304 can then use the final hash result or output to add the blockchain data to the blockchain.

In the illustrated implementations and according to the disclosed technology, the network computing devices 306 span multiple domains of the wireless telecommunication network 300 and together represent a heterogenous pool of computing resources. For example, the network computing devices 306 can include computing servers that implement core network functions of the wireless telecommunication network 300 (e.g., the network functions illustrated and described with FIG. 2, Evolved Packet Core network functions for a 4G LTE network, 6G core network functions), base stations or network access nodes of the wireless telecommunication network 300, and personal devices or user devices connected to the wireless telecommunication network 300. For example, the network computing devices 306 can include at least a subset of the systems and devices shown in FIG. 1, including wireless devices 104, base stations 102, components of the core network 106, and the like. For example, personal devices or user devices included in the network computing devices 306 used for performing blockchain operations can include smart phones, cell phones, laptops, HMDs, extended reality (XR, virtual reality or VR, mixed reality or MR, augmented reality or AR) devices, tablets, smart watches, vehicular systems, desktops, local area network (e.g., Wi-Fi) routers, 5G routers, Internet-of-Things (IoT) devices, in-vehicle computing systems of vehicles (e.g., autonomous vehicles), and/or the like.

In some implementations, the BCSRF 302 is implemented by one or more of the network computing devices 306. For example, in some implementations, the BCSRF 302 is a core network function (e.g., such as the network functions illustrated and described with FIG. 2) implemented by core network servers of the wireless telecommunication network 300. As another example, in some implementations, the BCSRF 302 is a standalone computing device or system that is connected to the wireless telecommunication network 300. In some implementations, the BCSRF 302 is dynamically implemented across multiple of the network computing devices 306 according to available load and usage of the network computing devices 306. Thus, in addition to blockchain operations or computations being dynamically distributed across the network computing devices 306, the BCSRF 302 itself can also be dynamically distributed across the network computing devices 306.

In example implementations, the BCSRF 302 is configured to use and/or implement an ML model 308 that is configured and trained to optimize the distribution of blockchain data and operations among the network computing devices 306. In particular, in some implementations, the ML model 308 provides an output that indicates certain network computing devices that can be used for performing blockchain operations, such as cryptographic hash operations for blockchain data. The ML model 308 can be used to determine a distribution of blockchain data and operations among the network computing devices 306 based on capability profiles associated with each network computing device 306 and real-time capability/usage data associated with each network computing device 306. The distribution determined according to the ML model 308 can be optimized for a time constraint, such as a maximum time within which a final hash result needs to be returned to the blockchain node 304, or generally for time minimization. Due to some network computing devices 306 being mobile devices (e.g., smart phones, laptops), real-time capability/usage data for such network computing devices can include real-time network latency which affects the optimization with respect to a time constraint or time minimization.

In some implementations, the BCSRF 302 periodically uses the ML model 308 to pre-select or pre-determine certain network computing devices 306 having available resources before receiving a service request. For example, the BCSRF 302 can periodically obtain (e.g., via request) real-time capability/usage information from network computing devices 306 and use the ML model 308 with the obtained real-time information, such that a list of available network computing devices 306 is on-hand whenever a service request is received.

In some examples, the ML model 308 is implemented by a model. A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the ML model 308 can be a neural network with multiple input nodes that receive capability profile data of a set of network computing devices 306 and/or real-time capability/usage data of the set of network computing devices 306. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used as an indication of whether a given network computing device 306 should be recruited to perform computations or operations for a blockchain operation. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

In some implementations, the ML model 308 is configured and trained for a model input that includes each node available capacity on computation power, its latency to the BCSRF, duration of its availability for the said capacity, and the corresponding time so that the ML model can predict during the next period of the time that the computation needs to be done, which node should be the best node to select, or a combination of multiple nodes so that the computation could be done within the given period of time. In some implementations, the predictive output of the ML model 308 is determined based on the ML model 308 being trained on a training dataset. In some implementations, the training dataset includes large volumes of data from historical operations that can be verified and labelled by a user. For example, the training dataset can include historical request parameters, information that describes the historical environment or distribution of resources at the time of a historical request, and historical selections of network computing resources to use for a historical request. In some embodiments, the training dataset or the training of the ML model 308 generally can be updated based on subsequent operations of the BCSRF.

According to the example implementation illustrated in FIG. 3A, the blockchain node 304 that interfaces with the BCSRF 302 belongs to the wireless telecommunication network 300. For example, in some implementations, a blockchain is a network-internal blockchain (e.g., a private blockchain) that resides within the wireless telecommunication network 300. In such an implementation, blockchain nodes 304 that support the blockchain can be a subset of the network computing devices 306 of the wireless telecommunication network 300. Thus, when a blockchain node 304 requests distributed network resource usage via the BCSRF 302 for a blockchain operation (e.g., cryptographically hashing a set of transaction data), the resources that are requested belong to other computing devices in the wireless telecommunication network 300. The blockchain node 304 can send requests to the BCSRF 302 and receive results from the BCSRF 302 within the same network.

FIG. 3B illustrates another example implementation, specifically, an implementation in which a blockchain network 301 of blockchain nodes 304 resides outside of the wireless telecommunication network 300. For example, the blockchain associated with the blockchain network 301 is a network-external blockchain, or a public blockchain, and the various blockchain nodes may not necessarily be connected to blockchain network 301 via the wireless telecommunication network 300. For example, the blockchain network 301 resides in the Internet or another data network outside of the wireless telecommunication network 300. In the example implementation illustrated in FIG. 3B, the wireless telecommunication network 300 includes an application programming interface (API) gateway 310 via which blockchain nodes 304 that are external to the wireless telecommunication network can send requests to the BCSRF 302 of the wireless telecommunication network 300 and receive results therefrom. In some implementations, the API gateway 310 enables multiple requests received from one or more blockchain nodes 304 to be verified, managed, and rate-limited before being received by the BCSRF 302. An API provided by the BCSRF 302 and accessible via the API gateway 310 is configured to receive API requests from blockchain nodes 304, with the API requests including at least data to be processed (e.g., hashed). In some implementations, the API requests originating from blockchain nodes 304 can further include an amount or a volume of the data to be processed, a time constraint (e.g., a minimum time within which a final data result or output needs to be returned), and/or the like.

Some example implementations may incorporate concepts related to both FIGS. 3A and 3B. For example, a first subset of blockchain nodes 304 in a blockchain network 301 may belong to a wireless telecommunication network 300 while a second subset may not, and the wireless telecommunication network 300 includes an API gateway 310 so that the second subset of blockchain nodes 304 can still use the BCSRF 302 of the wireless telecommunication network 300. In some implementations, the blockchain supported by a plurality of blockchain nodes 304 is a public blockchain, a private blockchain, a hybrid blockchain, a consortium blockchain, and/or the like, and the BCSRF 302 can be configured to be accessible by one, a subset, or all of the blockchain nodes 304 associated with the blockchain.

Example implementations of the disclosed technology, including those shown in FIGS. 3A and 3B, can be established or initiated based on various registration and initiation processes. In some examples, the registration and initiation processes can be performed prior to a request for network resource usage being received from a blockchain node 304. In particular, the BCSRF 302 may broadcast or transmit a discovery request throughout the wireless telecommunication network 300 to identify network computing devices 306, in some implementations. Network computing devices 306 that respond to the discovery request originating from the BCSRF 302 can be registered by the BCSRF 302 as potential devices having computing resources that can be recruited for blockchain operations or computations. In some implementations, the discovery request originating from the BCSRF 302 may be propagated outside of the wireless telecommunication network 300. For example, in some implementations, a given network computing device that receives the discovery request can forward the discovery request to other devices that belong to a different wireless telecommunication network. In this way, the pool of potential computing resources usable for blockchain operations or computations can be scalable beyond a given wireless telecommunication network. In some implementations, a given network computing device describes its respective computing resource capabilities when responding to the discovery request. For example, a given network computing device can indicate a number of central processing unit (CPU) and/or graphical processing unit (GPU) cores that the given network computing device includes, a size of random access memory and/or other memory storages, current network speed or latency, and/or the like. In some implementations, the capability information provided by network computing devices 306 in response to a discovery request originating from the BCSRF 302 can be used by the BCSRF 302 to generate capability profiles for the network computing devices 306, the capability profiles describing a default resource capability or a maximum amount of computing resources that the network computing devices 306 can dedicate to blockchain operations and computations.

In some implementations, blockchain nodes 304 can identify themselves to the BCSRF 302, for example in response to the discovery request, with a service subscription message. For example, a blockchain node 304 can subscribe to the blockchain service provided by the BCSRF 302 so that the blockchain node 304 can later request network resource usage via the service subscription.

In some implementations, blockchain nodes 304 and network computing devices 306 may be discovered by the BCSRF 302 based on a discovery request broadcast by the BCSRF 302. In response to the discovery request that is broadcast by the BCSRF 302, blockchain nodes 304 and network computing devices 306 can transmit discovery responses to the BCSRF 302 so that the BCSRF 302 becomes aware of the blockchain nodes 304 and network computing devices 306. When the blockchain nodes 304 and network computing devices 306 are interested in providing or receiving the services of the BCSRF 302, the blockchain nodes 304 and network computing devices 306 can initiate a subscription process with the BCSRF 302, for example, at a later point in time.

Figure 4:
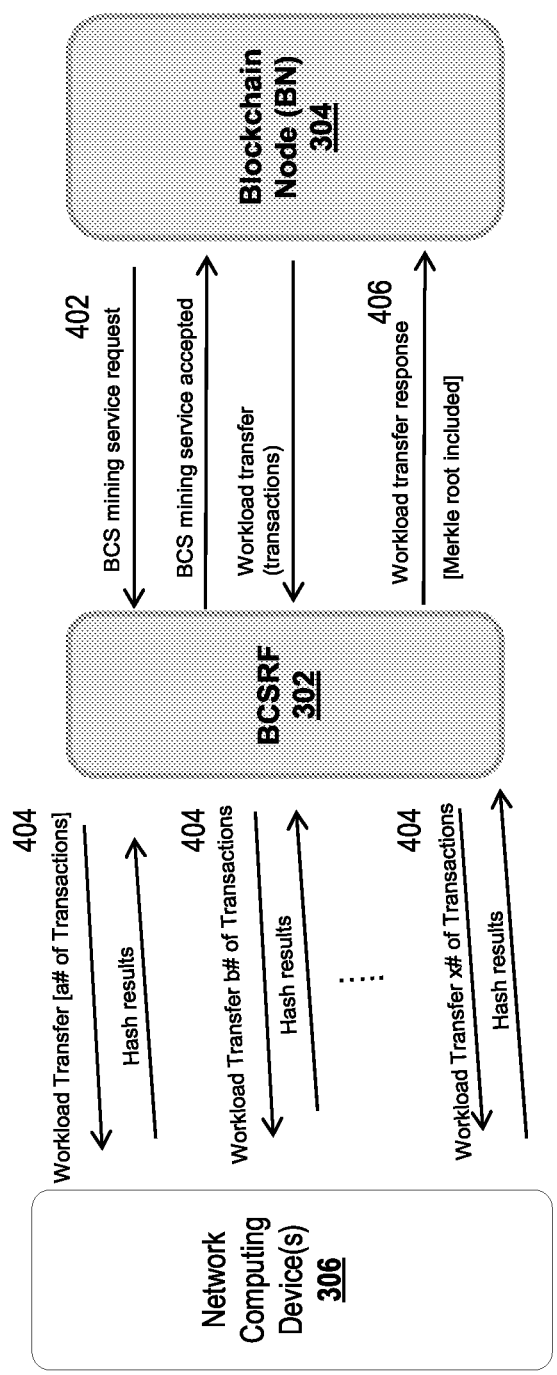
FIG. 4 is a sequence diagram that illustrates example operations related to dynamically selecting cross-domain or heterogenous computing resources throughout a wireless telecommunication network for blockchain operations, in accordance with embodiments of the present disclosure.

Turning now to FIG. 4, a sequence diagram is provided to illustrate example operations performed by a network-integrated blockchain service, for example the BCSRF 302. As discussed, the BCSRF 302 provides a service for blockchain nodes 304 to use the heterogenous and cross-domain computing resources belonging to a wireless telecommunication network to perform intensive operations, such as cryptographic hash operations. The network computing devices of a telecommunication network, such as a 5G/6G network, are caused to perform the intensive operations on pre-operation blockchain data provided by a blockchain node, in some examples.

At 402, the BCSRF 302 receives a service request from a blockchain node 304. In some implementations, the BCSRF 302 receives the service request via an API. The service request is a request by the blockchain node 304 for usage of network computing resources, and the service request can indicate the type of operations requested and can include the data to be operated on in the operations (e.g., pre-operation blockchain data). In the illustrated example, the service request is a mining service request, requesting that cryptographic hash puzzles be solved to verify transaction data to be added to a blockchain associated with the blockchain node 304. It will be appreciated that the service request can be associated with other types of blockchain-related tasks, such as temporary and/or remote (from the blockchain node 304) storage of blockchain blocks.

In some implementations, the BCSRF 302 provides a response to the service request. The response can be an acknowledge of the service request. In some implementations, the BCSRF 302 uses the ML model 308 to determine whether the service request can be fulfilled (e.g., with respect to a pre-defined time constraint, with respect to a time constraint indicated by the service request), and the BCSRF 302 can deny the service request based on a determination that the service request cannot be fulfilled. In some implementations, the BCSRF 302 can use capability profile information for the network computing devices 306 and/or real-time capability/usage data for the network computing devices 306 to determine whether the service request can be timely fulfilled. In some implementations, the data to be processed is transferred from the blockchain node 304 to the BCSRF 302 in response to a request acknowledgement being received by the blockchain node 304.

At instances of 404, the BCSRF 302 causes the network computing devices 306 to perform operations and return operation results or outputs. In the illustrated example in which the service request is for blockchain mining, the BCSRF 302 causes the network computing devices 306 to perform cryptographic hash operations, and the BCSRF 302 receives the hashed data that resulted from the cryptographic hash operations. In another example in which the service request is associated with a temporary storage of blockchain blocks, the BCSRF 302 can cause the network computing devices 306 to store portions of the blockchain blocks, and the BCSRF 302 receives a confirmation that the blockchain blocks were stored successfully. As discussed, the BCSRF 302 can identify specific network computing devices for performing the requested operations by using a ML model with capability profile information for the network computing devices 306 and/or real-time capability/usage information.

At 406, the BCSRF 302 returns an operation result or output to the blockchain node 304 in response to the service request. In some implementations, the BCSRF 302 determines or generates a final operation result or output based on aggregating individual results provided by the network computing devices 306. Thus, the sequence diagram illustrated in FIG. 4 demonstrates the service provided by the BCSRF 302 in which a blockchain node 304 transmits a service request to the BCSRF 302 (at 402) and receives a service result or output from the BCSRF 302 (at 406).

Figure 5:
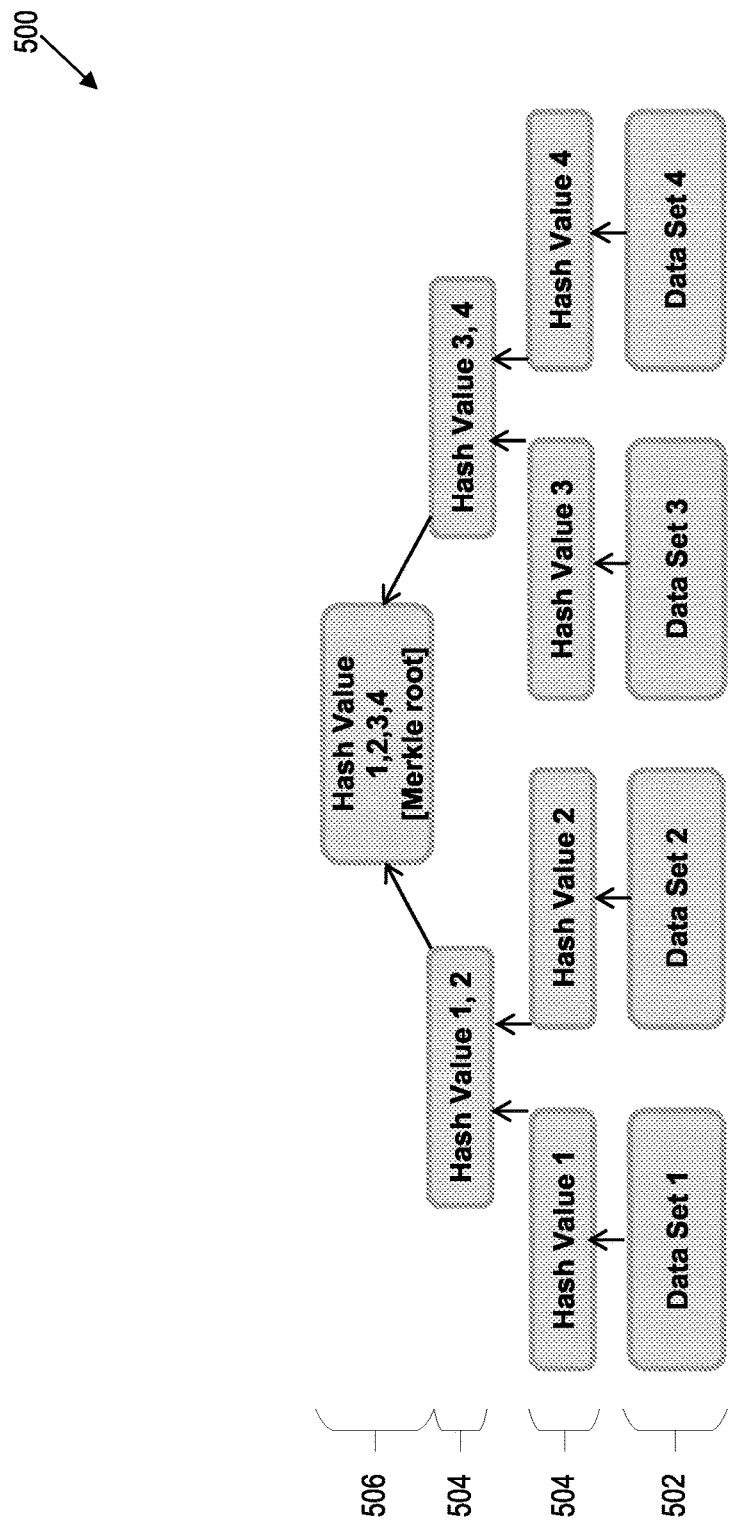
FIG. 5 is a diagram that indicates example blockchain operations that can be distributed to different computing devices within a cellular network, in accordance with embodiments of the present disclosure.

In some examples, the service result or output is determined iteratively based on aggregating multiple results. Returning to the example of blockchain mining, a final hash value used to verify a mined block is a Merkle root, and a Merkle root is obtained based on hierarchical operations, as demonstrated in FIG. 5. In particular, FIG. 5 illustrates a Merkle tree 500 that demonstrates, for a plurality of datasets 502 (e.g., blockchain data, or transaction data to be added to a blockchain), intermediate hash values 504 are determined at one or more hierarchical levels to obtain a final hash value 506 that is associated with the plurality of datasets 502. In the illustrated example, there are two intermediate hierarchical levels in the Merkle tree 500, although, it will be understood that an example Merkle tree can include any number of hierarchical levels based on a number of datasets 502.

Figure 6:
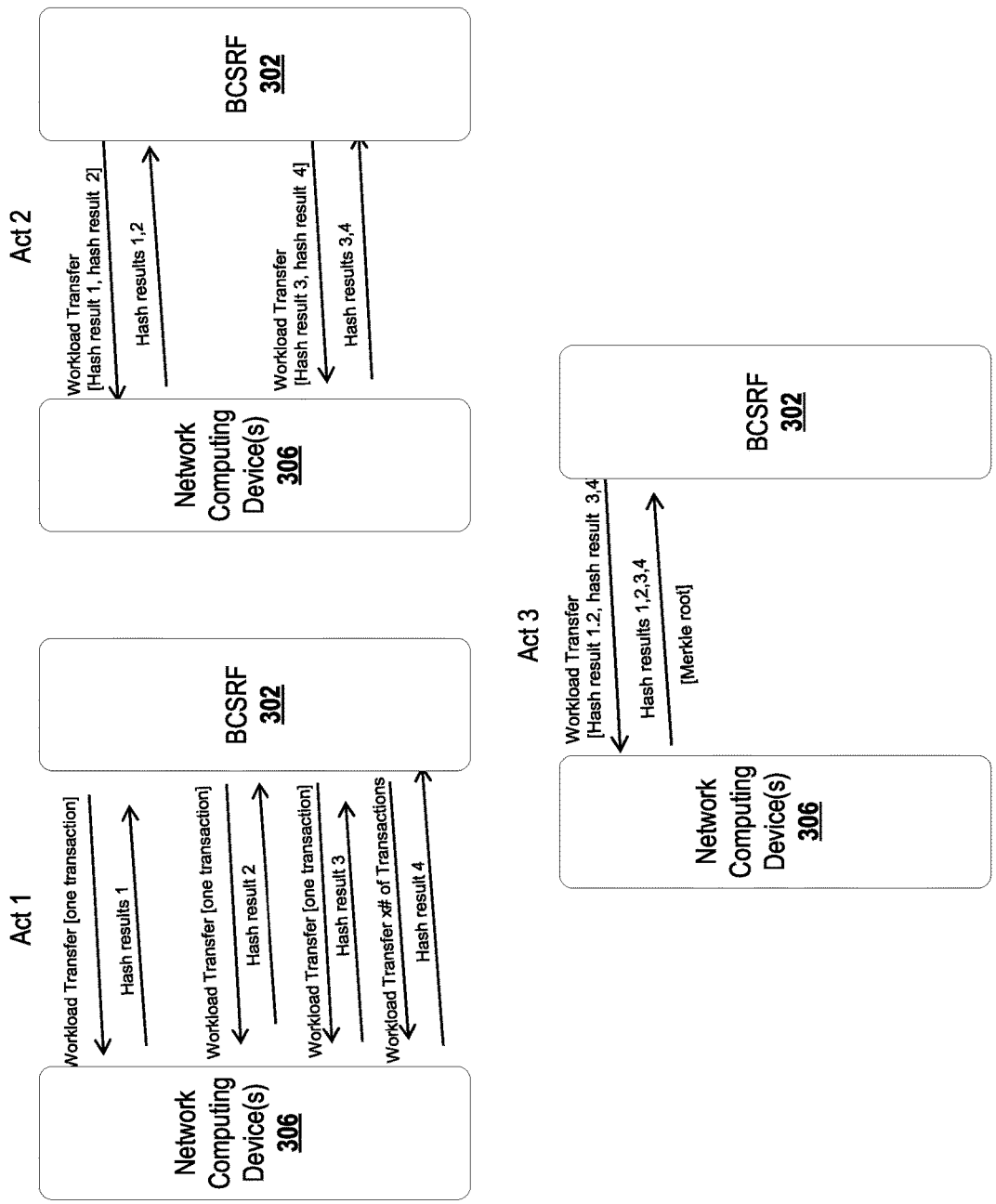
FIG. 6 includes sequence diagrams that demonstrate an iterative distribution of blockchain operations to computing resources throughout a wireless telecommunication network, in accordance with embodiments of the present disclosure.

FIG. 6 includes sequence diagrams that demonstrate multiple iterations of network resource usage, for example, in accordance with a Merkle tree or other hierarchical or iterative blockchain operation. The illustrated example shows three steps, corresponding to the two intermediate levels and the final hash value 506 of the Merkle tree 500 of FIG. 5.

Act 1 in FIG. 6 is performed for the BCSRF 302 to first obtain the intermediate hash values 504 of the first intermediate hierarchical level of the Merkle tree 500, or in particular, to obtain "Hash Value 1," "Hash Value 2," "Hash Value 3," and "Hash Value 4." The BCSRF 302 can transfer the datasets 502 to selected network computing devices for the selected network computing devices to determine the intermediate hash values 504. In some implementations, the BCSRF 302 may determine, according to an output of the ML model, to transfer one dataset 502 to each of a selected set of network computing devices 306, a plurality of datasets 502 to each of the selected set of network computing devices 306, a portion of a dataset 502 to each of the selected set of network computing devices 306, and/or the like.

Act 2 in FIG. 6 can then be performed for the BCSRF 302 to obtain a next set of intermediate hash values 504 corresponding to a second intermediate hierarchical level of the Merkle tree 500, or in particular, to obtain "Hash Value 1/2" and "Hash Value 3/4." To do so, the BCSRF 302 can aggregate or combine previously-received intermediate hash results and send the aggregations or combinations to the network computing devices 306 for determining hashes of the aggregations or combinations. In some implementations, the network computing devices 306 selected in Step 2 are different than those used in Step 1. For example, with Step 2 occurring subsequent to the completion of Step 1, real-time capability/usage data (e.g., including real-time network latency) across the network computing devices 306 may have changed, and different network computing devices 306 may be more optimally used in Step 2 compared to those of Step 1. In some implementations, a set of network computing devices 306 is consistently used throughout multiple iterations of network resource usage, for example, through Step 1, Step 2, and Step 3. In particular, in such implementations, the initial selection of the network computing devices 306 via the ML model (e.g., before Step 1) can consider the number of iterations needed to complete the blockchain operation and predict capability/usage states of the network computing devices 306. Accordingly, the BCSRF 302 initially predicts and selects network computing devices 306 that will retain capability through multiple iterations of network resource usage.

Act 3 in FIG. 6 demonstrates the BCSRF 302 obtaining the final hash value 506 of the Merkle tree 500. The BCSRF 302 aggregates the intermediate hash values 504 received in the previous iteration(s), and the network computing devices 306 use the provided data to again perform hash operations. The final hash value 506 obtained in Step 3 can be the final result provided by the BCSRF 302 to a requesting blockchain node.

The example implementation shown in FIG. 6 corresponding to levels of a Merkle tree that are traversed to obtain a Merkle root. In some implementations, repeated iterations of network resource usage may not be tied to such a logical structure or requirement. That is, in some implementations, the BCSRF 302 is configured to define multiple intermediate steps, sub-operations, levels, and/or the like of a blockchain operation requested by a blockchain node 304, and the BCSRF 302 can parse out workload according to the BCSRF-defined intermediate portions of the blockchain operation. In some implementations, the BCSRF 302 is configured to define intermediate portions of a blockchain operation according to real-time and predicted capabilities and usages of the network computing devices 306. For example, based on predicting that a minimal amount of resources are available for a long time period, the BCSRF 302 can define multiple intermediate portions or sub-operations, and in contrast, the BCSRF 302 can define a fewer number of intermediate portions or sub-operations based on predicting that a large amount of resources are available for a short time period.

Example Operations for Providing a Blockchain Service

Figure 7:
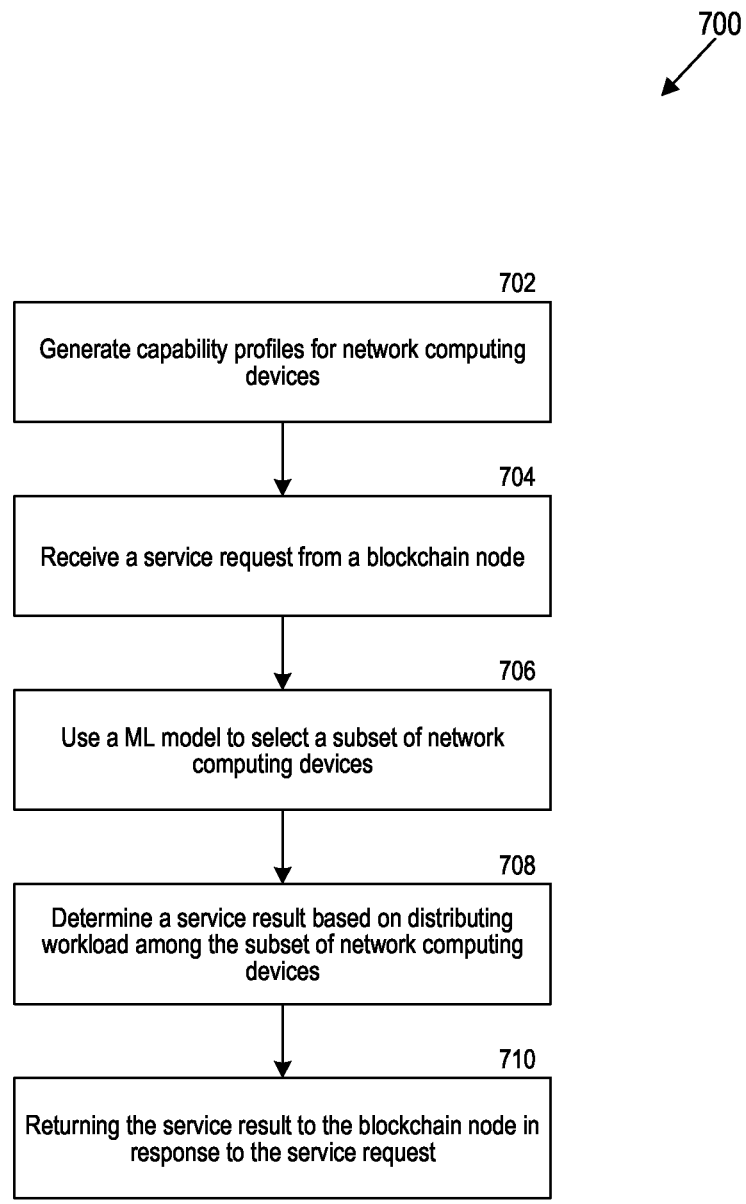
FIG. 7 is a flow diagram that illustrates example operations implemented by a network-integrated blockchain service for dynamically selecting cross-domain or heterogenous computing resources throughout a wireless telecommunication network for blockchain operations, in accordance with embodiments of the present disclosure.

FIG. 7 illustrates a flow diagram that includes an example process 700 performed for ML-based usage of heterogenous or cross-domain network computing resources for blockchain operations. In an example implementation, the flow diagram of FIG. 7 describes a process 700 performed by a system within a wireless telecommunication network to implement a network-integrated blockchain function or service, such as the BCSRF 302. Across various implementations, the system is included in any one or more of: an application server that also supports one or more core network functions of the wireless telecommunication network (or one or more instances of an application server), a base station, a personal device connected to the wireless telecommunication network, and/or the like. That is, the example operations may be performed at one or more of the different domains of the wireless telecommunication network. In some implementations, the network-integrated blockchain function or service is dynamically implemented by different systems within the wireless telecommunication network, and accordingly, the example operations illustrated in FIG. 7 may be performed by different systems within the wireless telecommunication network, for example.

At operation 702, the system generates a capability profile for each of a plurality of network computing devices. The capability profile describes an amount of computing resources associated with a respective network computing device, such as a number of processing cores, a size of memory storage, processor clock speed, and/or the like. In some examples, the plurality of network computing devices is heterogenous, and the capability profile further indicates a device type, such as server, mobile device, base station, and/or the like. In some implementations, the capability profile is generated for a respective network computing device according to a device type of the respective network computing device. The system can store and maintain capability profiles for later use in selecting network computing devices for a blockchain service. In some implementations, the system generates a capability profile based on a registration between the system and a respective network computing device. In some implementations, the registration is performed in response to a broadcast by the system throughout the wireless telecommunication network.

At operation 704, the system receives a service request from a blockchain node. The service request indicates a blockchain operation or computations for which the blockchain node requests usage of network computing resources. For example, for a mining blockchain operation, the service request includes data to be cryptographically hashed so that the blockchain node can add the data to a blockchain. In some examples, the blockchain node is connected to the blockchain network via the wireless telecommunication network, and the system receives the service request from the particular blockchain node within the wireless telecommunication network. In some examples, the blockchain node is outside of the wireless telecommunication network, and the system receives the service request via an API gateway.

At operation 706, the system selects a subset of network computing devices for performing the blockchain operation or computations indicated by the service request, and in some implementations, the system uses a ML model to select the subset. The ML model can be trained to select the subset based on respective capability profiles and real-time capability/usage data obtained from the network computing devices. In some examples, the real-time capability/usage data includes real-time network latencies of the network computing devices, which can affect how quickly the system can obtain operation or computation results. In some implementations, the ML model is trained to select the subset of the network computing devices based on comparing the respective latencies and a predicted computation time of the subset of the network computing devices with a time constraint for determining the final hash result. In some examples, the service request indicates the time constraint. In some implementations, the system is configured to transmit a service denial response to the blockchain node in response to a prediction via the ML model that the time constraint cannot be satisfied. In some implementations, the system selects the subset of network computing devices on a periodic basis, with the ML model and real-time capability/usage data. In some implementations, the system selects the subset of network computing devices in response to receiving the service request.

At operation 708, the system determines a service result, such as a final hash value, based on distributing workload among the subset of network computing devices. In some examples, the workload (e.g., including portions of data to be processed) are distributed in one or more iterations to the subset of network computing devices. For example, portions of non-hashed data or pre-operation blockchain data (e.g., data to be stored by network computing devices) is distributed among the subset of network computing devices in a first iteration, and in at least one intermediate iteration, intermediate hash results (obtained from the non-hashed data) are distributed among the subset of network computing devices for further hashing. In some implementations, the subset of network computing devices dynamically changes between iterations of workload distribution. For example, the system, between two iterations, uses the ML model to select a second subset of network computing devices for performing a subsequent iteration.

At operation 710, the system returns the service result to the blockchain node in response to the service request. In some implementations, the system determines the service result based on different outputs or result components provided by different network computing devices of the subset.

Figure 8:
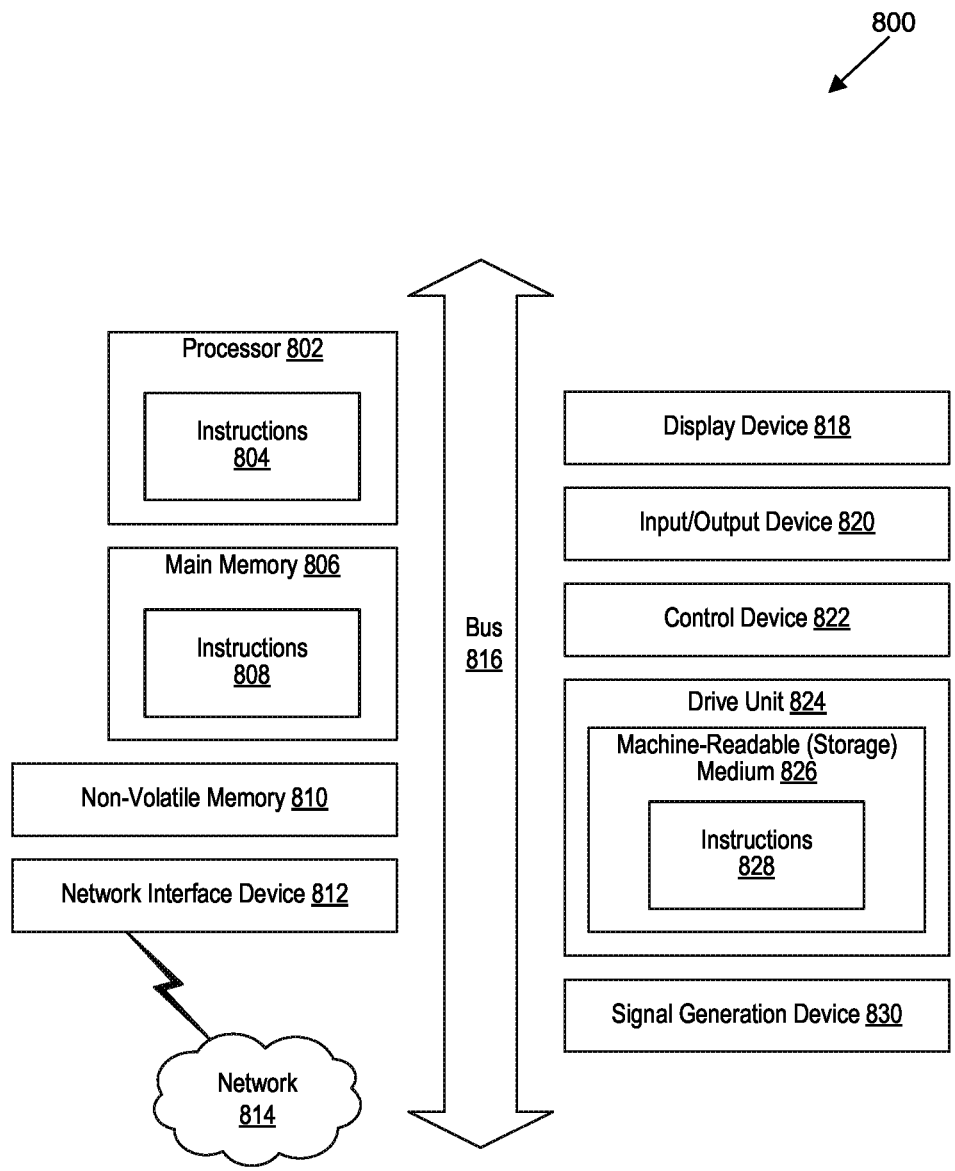
FIG. 8 is a block diagram that illustrates an example of a computer system in which at least some operations described herein can be implemented.

In some implementations, the system further records distribution data (e.g., a distribution log, distribution information) that describes allocation of workload among the network computing devices and/or actual amounts of computing resources expended by the network computing devices. For example, together with hash results, a network computing device can send an indication of an amount of computing resources used to determine the hash results to the system. With the distribution data, the system is able to proportionally distribute blockchain assets or tokens (e.g., Bitcoin) that are rewarded in exchange for performing the blockchain operation or computations. For example, in a blockchain mining example, the blockchain tokens are awarded to entities that determine hashes of mined blockchain data, and the system can proportionally distribute the awarded blockchain tokens among the network computing devices. In some examples, the blockchain node receives the blockchain tokens from the blockchain network and provides the blockchain tokens to a token repository (e.g., a Bitcoin wallet) associated with the system (e.g., the BCSRF 302). The system, storing an indication of respective token repositories associated with different network computing devices, can then transfer amounts of blockchain tokens from its token repository to different respective token repositories, in some implementations. Example Computer Systems FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, video display device 818, an input/output device 820, a control device 822 (e.g., keyboard and pointing device), a drive unit 824 that includes a storage medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computer system 800 can share a similar architecture as that of a server computer, personal computer (PC), tablet computer, mobile telephone, game console, music player, wearable electronic device, network-connected ("smart") device (e.g., a television or home assistant device), ARNR systems (e.g., head-mounted display), or any electronic device capable of executing a set of instructions that specify action(s) to be taken by the computer system 800. In some implementation, the computer system 800 can be an embedded computer system, a system-on-chip (SOC), a single-board computer system (SBC) or a distributed system such as a mesh of computer systems or include one or more cloud components in one or more networks. Where appropriate, one or more computer systems 800 can perform operations in real-time, near real-time, or in batch mode.

The network interface device 812 enables the computer system 800 to mediate data in a network 814 with an entity that is external to the computer system 800 through any communication protocol supported by the computer system 800 and the external entity. Examples of the network interface device 812 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computer system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computer system 800 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the disclosed technology. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the present disclosure, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the present disclosure should not be taken to imply that the terminology is being redefined herein to be restricted to any specific characteristics, features, or aspects of the present disclosure with which that terminology is associated. In general, the terms used in the following claims should not be construed to limit the present disclosure to the specific examples disclosed herein, unless the above Detailed Description explicitly defines such terms. Accordingly, the actual scope of the present disclosure encompasses not only the disclosed examples, but also all equivalent ways of practicing or implementing the disclosed technology under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the disclosed technology can be modified to employ the systems, functions, and concepts of the various references described above to provide yet further implementations of the disclosed technology.

To reduce the number of claims, certain implementations are presented below in certain claim forms, but the applicant contemplates various aspects of the disclosed technology in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A system of improved resource usage for a proof-of-work (POW) blockchain, the system including:
    a wireless telecommunication network including:
        a plurality of network computing devices having one or more different device types, the different device types comprising (i) a core network server, (ii) an access network base station, or (iii) a user device connected to the wireless telecommunication network, and
        a blockchain service repository function (BCSRF) in communication with a particular blockchain node of a blockchain network associated with the POW blockchain, the BCSRF being configured to:
            generate, based on a registration between the BCSRF and a given network computing device, a capability profile that describes an amount of computing resources associated with the given network computing device according to a respective device type;
            receive a service request from the particular blockchain node, wherein the service request includes pre-operation blockchain data to be added to the POW blockchain by the particular blockchain node based on the pre-operation blockchain data being cryptographically hashed; and
            apply a trained machine learning (ML) model to select a particular subset of the network computing devices for performing one or more cryptographic hash operations with the pre-operation blockchain data,
wherein the ML model is trained to select network computing devices using capability profiles and real-time usage data describing at least latencies of the network computing devices with respect to the wireless telecommunication network; and
distribute the pre-operation blockchain data to the particular subset of the network computing devices to cause the particular subset of the network computing devices to perform the one or more cryptographic hash operations with the pre-operation blockchain data.

2. The system of claim 1, further comprising the blockchain network, wherein the blockchain network is operated by an operating entity of the wireless telecommunication network, and wherein the particular blockchain node is connected to the blockchain network via the wireless telecommunication network, and wherein the BCSRF receives the service request from the particular blockchain node within the wireless telecommunication network.

3. The system of claim 1, wherein the BCSRF is further configured to:
determine a final hash result based on operation results received from the particular subset of the network computing devices;
return the final hash result to the particular blockchain node in response to the service request; and
record distribution data that describes actual resource usage by the particular subset of the network computing devices for the one or more cryptographic hash operations to enable a proportional allocation of blockchain tokens obtained by the BCSRF in exchange for the final hash result.

4. The system of claim 1, wherein the BCSRF is further configured to distribute intermediate operation results received from the particular subset of the network computing devices to one or more second subsets of network computing devices to cause one or more intermediate iterations of the cryptographic hash operations, wherein the one or more second subsets of network computing devices are selected based on applying the trained ML model.

5. The system of claim 1, wherein the ML model is further trained to select network computing devices based on comparing the latencies of the network computing devices and a predicted computation time of the one or more cryptographic hash operations against a time constraint associated with the service request.

6. The system of claim 1, wherein the BCSRF is further configured to:
in response to a prediction by the trained ML model that a time constraint associated with the service request cannot be satisfied by distributing the pre-operation blockchain data to the particular subset of the network computing devices, transmitting a service denial response to the particular blockchain node.

7. The system of claim 1, wherein the trained ML model is used on a periodic basis with the real-time usage data such that the particular subset of the network computing devices is pre-selected before the service request is received.

8. The system of claim 1, wherein the registration between the BCSRF and a given network device is performed in response to a broadcast by the BCSRF throughout the wireless telecommunication network.

9. The system of claim 1, wherein the wireless telecommunication network further implements an application programming interface (API) gateway via which the BCSRF receives the service request from the particular blockchain node of the blockchain network.

10. An apparatus of a wireless telecommunication network comprising at least one data processor and a memory storing instructions that, when executed by the at least one data processor, cause the apparatus to implement a blockchain operation service by:
storing a plurality of capability profiles for a multi-domain plurality of network computing devices associated with the wireless telecommunication network;
receiving a service request from a blockchain node associated with a blockchain, wherein the service request includes pre-operation blockchain data;
selecting a subset of network computing devices based on a capability prediction that is output by a ML model in response to the plurality of capability profiles and real-time usage data describing real-time network latencies associated with particular network computing devices; and
causing the subset of network computing devices to perform encryption operations on the pre-operation blockchain data.

11. The apparatus of claim 10, wherein the apparatus is caused to implement the blockchain operation service further by:
returning a final operation output to the blockchain node in response to the service request, wherein the final operation output is determined based on operation results received from the subset of network computing devices.

12. The apparatus of claim 10, wherein the apparatus is caused to implement the blockchain operation service further by:
recording distribution data that describes an amount of resources used by the subset of network computing devices to perform the encryption operations, wherein the distribution data enables a proportional distribution of blockchain tokens received from the blockchain node in exchange for a result response to the service request.

13. The apparatus of claim 10, wherein the subset of network computing devices is selected based on an evaluation of the real-time network latencies and a predicted computation time of the network computing devices against a time constraint associated with the service request.

14. The apparatus of claim 10, wherein the blockchain is a public blockchain residing external to the wireless telecommunication network, and wherein the service request is received via an API gateway of the wireless telecommunication network.

15. The apparatus of claim 10, wherein the capability prediction is output by the ML model on a periodic basis to enable pre-selection of the subset of network computing devices relative to the service request being received.

16. A method in a wireless telecommunication network, the method comprising:
registering a default resource capability of a plurality of network computing devices that spans multiple domains of the wireless telecommunication network;
receiving a service request from a blockchain node associated with a blockchain, wherein the service request includes pre-operation blockchain data;
selecting a subset of network computing devices based on a capability prediction output by a ML model in response to the default resource capability and real-time usage data for each network computing device, wherein the real-time usage data includes a real-time network latency for each network computing device;

causing the subset of network computing devices to perform one or more iterations of encryption operations on the pre-operation blockchain data or intermediate operation results; and transmitting, to the blockchain node, a hash data output that is determined based on aggregating results of the hash operations obtained from the subset of network computing devices.

17. The method of claim 16, further comprising:

collecting distribution data that describes an amount of resources consumed across the subset of network computing devices to perform the one or more iterations of hash operations; and proportionally distributing a number of blockchain tokens received from the blockchain node in exchange for the hash data output among the subset of network computing devices according to the distribution data.

18. The method of claim 16, wherein the blockchain is a public blockchain residing external to the wireless telecommunication network, and wherein the service request is received from the blockchain node via an API gateway of the wireless telecommunication network.

19. The method of claim 16, wherein the one or more iterations of hash operations are performed in accordance with a Merkle tree, and wherein the hash data output is a Merkle root.

20. The method of claim 16, wherein the subset of network computing devices is pre-selected before the service request is received.

* * * * *